United States Patent
Figie et al.

[11] Patent Number: 5,872,561
[45] Date of Patent: Feb. 16, 1999

[54] FAST SCANNING SWITCH MATRIX

[75] Inventors: John R. Figie, New Berlin; Gary Dan Dotson, Muskego, both of Wis.

[73] Assignee: Allen-Bradley Company, LLC, Milwaukee, Wis.

[21] Appl. No.: 829,762

[22] Filed: Mar. 31, 1997

[51] Int. Cl.$^6$ ........................................... G09G 5/00
[52] U.S. Cl. ........................ 345/168; 345/173; 341/22; 341/26
[58] Field of Search .................................. 345/168, 169, 345/173, 176; 341/20, 22, 26; 178/18–20, 18.01, 18.03, 19.01, 20.01

[56] References Cited

U.S. PATENT DOCUMENTS

| | | |
|---|---|---|
| 4,143,253 | 3/1979 | Wagner et al. ........................ 200/5 A |
| 4,665,461 | 5/1987 | Bader ........................................ 341/26 |
| 5,151,554 | 9/1992 | Matsuda ..................................... 341/26 |
| 5,430,443 | 7/1995 | Mitchell ..................................... 341/22 |
| 5,486,824 | 1/1996 | Kinerk et al. ............................ 341/26 |
| 5,552,568 | 9/1996 | Onadaka et al. ......................... 178/19 |
| 5,677,687 | 10/1997 | Valdenaire ............................... 341/26 |

*Primary Examiner*—Jeffery A. Hofsass
*Assistant Examiner*—Ashok Mannava
*Attorney, Agent, or Firm*—Keith M. Baxter; John M. Miller; John J. Horn

[57] ABSTRACT

Driving circuitry for a switch matrix provides a reset voltage to all rows of the matrix in between scans to recharge switch capacitance. Column detection circuitry is disabled in between scans so that column driving circuitry may also 'reset' the charge on capacitors reducing the scan time and/or allowing a greater number of switch elements, element size, or EMI suppressing capacitances. Pull-up resistors are supplemented or eliminated through the use of active current sourcing and sinking for the drivers.

5 Claims, 3 Drawing Sheets

FAST SCANNING SWITCH MATRIX

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates to electrical switches and in particular, to a multi-element switch matrix constructed to provide a rapid scanning of its elements.

A membrane switch switches electrical current across two contacting electrodes, at least one of which is attached to the rear surface of a flexible membrane. Pressing the front surface of the membrane near the contact deforms the membrane to bring the contact into electrical communication with the second contact opposing the first. The second contact may be attached to the front surface of a second flexible membrane rigidly supported by another surface.

The two membranes are typically spaced from each other by small insulating spacers distributed across the area between the membranes. The spacers permit the opposing contacts to touch only when the front membrane is pressed.

The contacts may be printed to the membranes by using conductive inks or deposited by vacuum metalization techniques or other methods known in the art. The conductors attaching the contacts to other circuitry may also in part be printed or deposited on the membranes.

Membrane switches find wide spread use in applications where sealed or protected switches or operating panels are needed. The front membrane provides a natural sealing of the contacts from outside contaminants.

Because the membranes and electrodes may be made transparent, one important application of membrane switches is for touch panels associated with CRT, LCD, Plasma, Electroluminescent displays. Here, a display directs the user to particular locations on the transparent membrane switch where pressing will activate a membrane switch. The number and caption of the switches may be readily changed (by changing the image on the display) thus providing a keyboard flexibly adapted for use with hierarchical menu structures in which a decision to press one key produces an entirely new keyboard with new choices.

It is often desired that a single pair of membranes support a number of separately operable contacts. These contacts may be arranged in a matrix of rows and columns on the membranes. In order to reduce wiring and circuitry for the matrix of contacts, each contact pair is normally scanned by row and column. For example, one terminal of the switch formed by each pair of contacts in each row may be connected to a common row line, and the other terminal may be connected to a common column line. These shared lines substantially reduce the amount of wiring to the switches.

In order to detect the closure of a switch, a unique voltage is applied to one row at a time and voltages at the columns are monitored to see which switches have closed. This process is repeated for each row, one at a time, on a rapid basis to ensure that even the briefest expected closure of a switch will be detected.

When the unique voltage is applied to a particular row, the other rows are connected to a different voltage by high impedance to prevent excessive currents in the event that more than one switch in a column is depressed. In a typical circuit, the rows may be driven low and the columns are passively pulled high to a voltage level above the switching threshold of the monitoring circuitry.

The pull up resistors must be large compared to the intrinsic resistance in the conductors and the expected contact resistance of the switches in order for proper detection threshold to be reached when switches are depressed. High resistance pull-up resistors are especially important in touch panels with transparent conductors which have high intrinsic resistances. The pull up resistors must also be large in case many switches in the array are depressed at once, which effectively places the pull up resistors in parallel. During this scanning process, the voltage on successive rows of the switches must be changed rapidly. The intrinsic resistance of the conductors to the switch contacts and the capacitance between the contacts (and added capacitance for the suppression of electromagnetic interference EMI) severely limits the speed with which such voltage changes may be accomplished. This, in turn, places practical limits on the number of switches that may be scanned within the prescribed time limits.

BRIEF SUMMARY OF THE INVENTION

The present invention provides a switch matrix with scanning circuitry that significantly increases the speed with which the switches may be scanned and thus which increases the number of switches that may be scanned. Two principal techniques are used. First, an analysis of the capacitance of the structure of a switch matrix has indicated that there is appreciable capacitive linking between rows. Hence, during scanning of a given row, the other rows which were previously held to a predetermined "reset" voltage, are in the present invention placed in a high impedance state. Second, the detector circuitry normally attached to the common column conductors of the matrix are teamed with low impedance drivers so that the capacitances of the matrix may be returned to the "reset" voltage through both the rows and the columns at the same time. These techniques are supplemented with a replacing of passive pull-up resistors with active devices, e.g., current pushing and pulling transistors to improve the rate of charging of the capacitors.

Specifically, the present invention provides a plurality of membrane switches having first and second terminals across which current may be switched, the first terminals electrically connected in rows and the second terminals electrically connected in columns. Row driving circuits are attached to each row for driving the row to one of a scan voltage, a reset voltage different from the scan voltage, or providing a high impedance to the row according to received scan signals. Column input circuits are attached to each column for detecting a voltage from the column to produce a detection signal. Scanning circuitry provides scan signals to the row driver circuits to selectively drive one row to the scan voltage during a scan period, then to the reset voltage during a succeeding reset time, the scanning circuitry further receiving the detection signals during the scan period to provide an indication of closed switches, the scanning circuitry further providing a high impedance signal to row driver circuits not receiving a scan signal during the scan time.

Thus it is one object of the invention to significantly decrease the effect of capacitances between a given scanned row and other unscanned rows. Driving the rows to a reset voltage in between scans improves the speed of the charging, of the associated switch capacitances improving scan speeds.

The row driving circuitry, when not receiving a high impedance signal or a scan signal, may receive a pre-charge signal providing a reset voltage to the row. The addressable switch may also include column output circuitry attached to each column for driving a column to the reset voltage upon receipt of a backdriving signal. The scanning circuitry provides the backdriving signal and the precharge signal after the scan signal for each row is removed.

Thus, it is another object of the invention to provide dual paths through which to charge the capacitances of the membrane switch so as to restore their voltages as quickly as possible during the scanning process. Generally, failure to completely restore the voltages on the capacitances of the switches prior to scanning the next row may cause the erroneous detection of switch closures in the next row.

The row driving circuitry and the column output circuitry may include solid state switching devices sinking or sourcing current to the rows.

Thus, it is another object of the invention to provide a substantially lower impedance driving of the membrane switches to improve the speed at which their voltages may be changed.

The foregoing and other objects and advantages of the invention will appear from the following description. In this description, references are made to the accompanying drawings which form a part hereof, and in which there are shown, by way of illustration, preferred embodiments of the invention. Such embodiments do not necessarily represent the full scope of the invention, however, and reference must be made therefore to the claims for interpreting the scope of the invention.

DETAILED DESCRIPTION OF THE INVENTION

Figure 1:
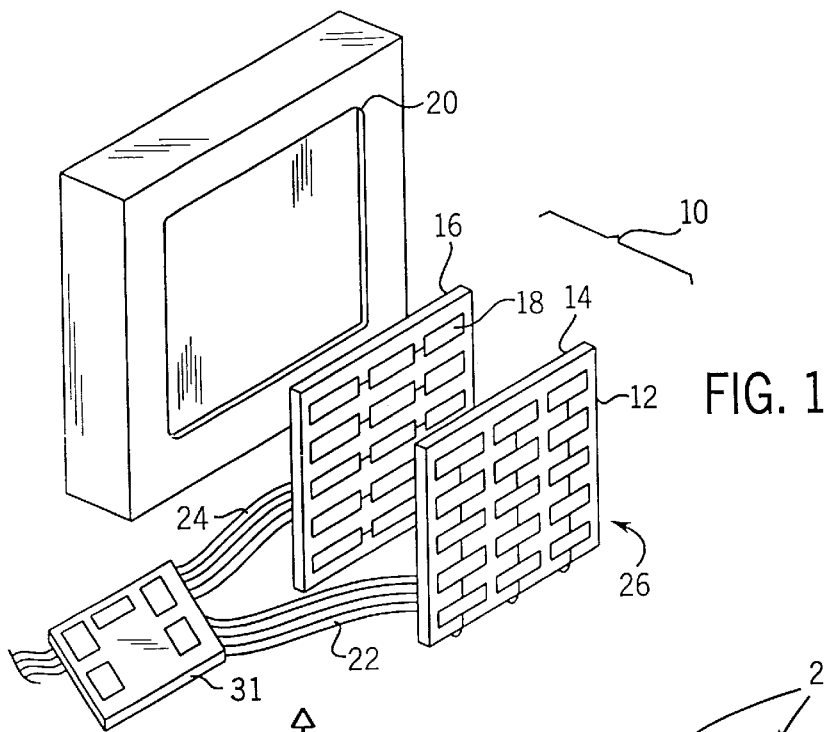
FIG. 1 is an exploded perspective view of a transparent membrane switch for use on a display terminal showing separate contacts on opposed membranes as connected to driving circuitry.

Referring to FIG. 1, a switch matrix 10 includes an outer, generally rectangular and planar forward membrane 12 constructed of a flexible, electrically insulating, transparent material. On its rear surface are placed a number of contacts 14. To the rear of the forward membrane 12 is a rearward membrane 16 equal in extent to the forward membrane 12 and having on its front surface a second set of contacts 18 each positioned directly across from one contact 14 so that when a finger or stylus presses down upon forward membrane 12, it deforms that membrane to cause contact 14 to touch corresponding contact 18 allowing current flow therebetween. Thus one contact 14 and one 18 form one membrane switch element 26.

Insulating spacers (not shown) positioned between membranes 12 and 16 separates the membranes in the absence of the pressing of a stylus of finger as has been described. Laminated together (about the spacer layer), membranes 12 and 16 may be placed in front of a display 20 to provide a touch screen such as is generally understood in the art.

Figure 2:
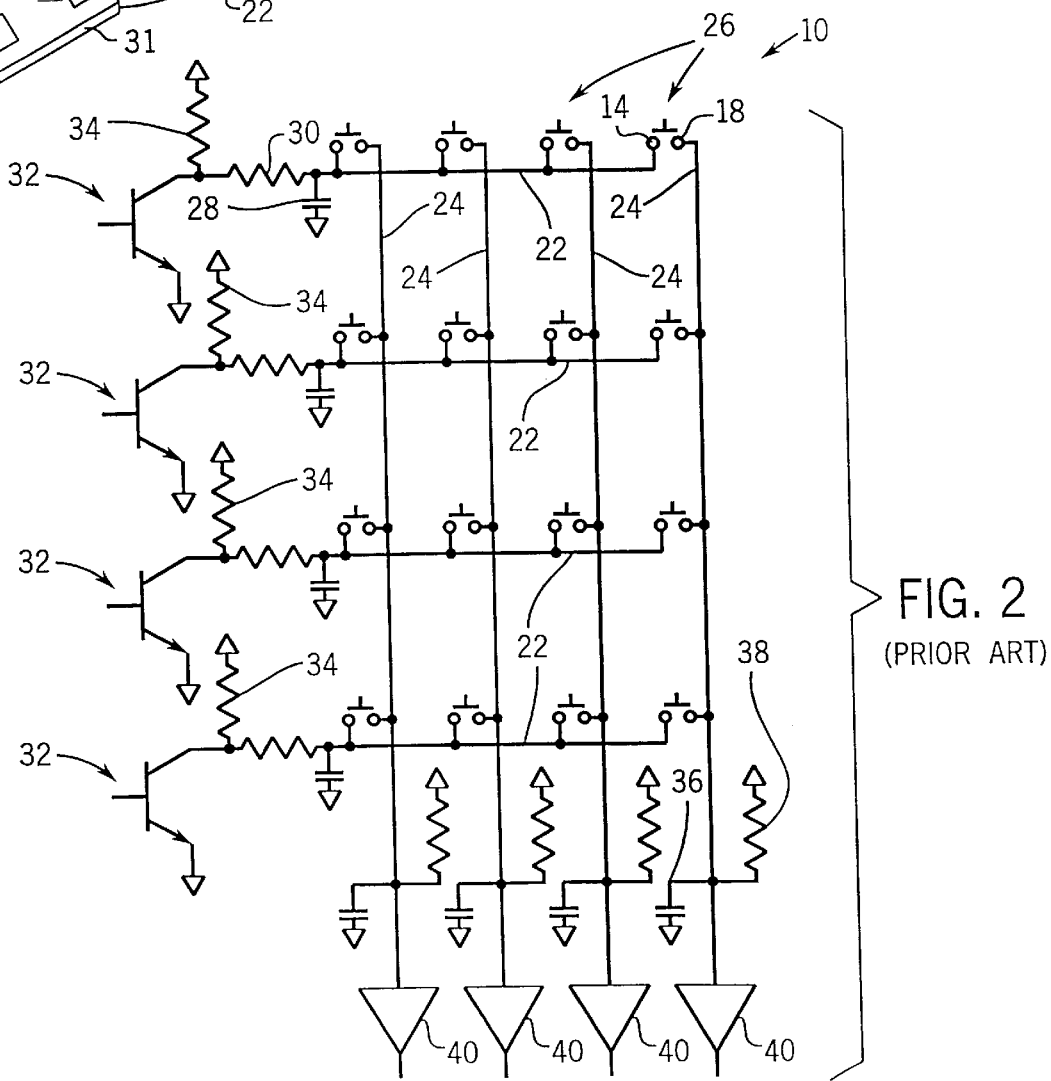
FIG. 2 is a schematic representation of a simplified 4×4 matrix of membrane switches showing pull-up resistors, noise suppression capacitors, and intrinsic conductor resistances depicted as discrete resistive elements.

Referring now to FIG. 2, contact 14 in each switch 26 is connected to a common, column line 24 joining the contacts 14 for all the switches 26 in that column. Similarly, the contact 18 in each switch is connected to a common row line 22 joining the left most contact 18 for all the switches 26 in that row. As depicted, there are sixteen switches 26 arranged in a square and hence four column conductors 24 and four row conductors 22. As used herein, a row will generally denote a horizontal connection and a column, a vertical connection. However, it will be understood from the following description that this is only a matter of convention and that the invention is unaffected by orientation and is applicable to other connection patterns including those which are not strictly rectilinear.

Each of the row conductors 22 and column conductors 24 is connected to a scanning circuit 31 having row driving circuitry and column circuitry to be described. The scanning circuitry 31 may include a microprocessor-type integrated circuit programmed to follow the steps that will be described below, or may be discrete circuitry as is well understood in the art. The construction of the membranes 12 and 16 and the connection of the resulting switches 26 into columns and rows is according to methods generally understood in the art.

Referring still to FIG. 2 in a prior art design, each row conductor 22 is connected to an ESD capacitor 28 providing a low impedance shunt to ground to attenuate high frequency electrical noise and to protect against static discharge. Each row conductor is also connected to the output of a row driver 32, the latter being an open collector type amplifier providing for the sinking of current only. Thus a pull-up resistor 34 will also be provided to pull the row conductor 22 to a high state absent activation of the row driver 32. Each row conductor 22 also has a significant distributed resistance represented by resistor 30 between row conductor 22 and row driver 32. Additional resistance occurs in the connections between contacts 14 and contacts 18 when they are closed.

Similarly, each column conductor 24 is connected to an EMI capacitor 36 and a pull-up resistor 38. The column conductors 24 are also connected to the inputs of detector amplifiers 40 which may detect whether a low or high voltage is present on column conductor 24. The detector amplifiers 40 may be Schmidt triggered, having built-in hysteresis for noise reduction, meaning that they switch at different thresholds depending on the direction of the transition of their inputs from high to low, or from low to high.

The scanning circuitry 31 activates row drivers 32, one at a time, to pull a single row conductor 22 to ground with the other row conductors being pulled high by respective pull-up resistors 34. If a single switch element 26 is activated, it provides a path of conduction between one row conductor 22 and one column conductor 24, such connection being detected by a pulling down of the voltage of the column conductor 24 which may be detected by one of the column detectors 40. As is understood in the art, the selective driving of each row conductor 22 and the reading of the column conductor voltages allows the determination of which switch elements 26 in the matrix have been activated with minimized wiring.

Figure 3:
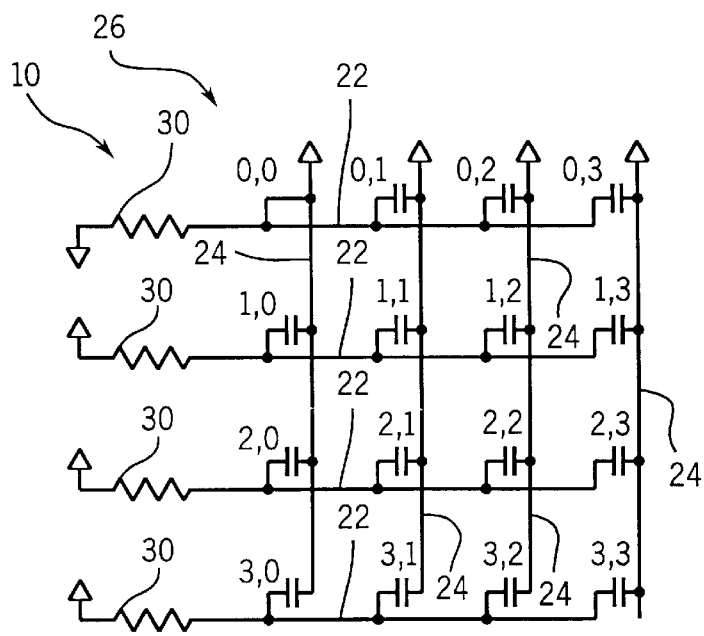
FIG. 3 is a representation similar to that of FIG. 2 showing the effective capacitances formed by the membrane switches themselves and showing one membrane switch in a closed state.

Referring now to FIG. 3, each of the switch elements 26, when open, acts like a capacitor providing a capacitive coupling between columns and rows. When a switch element is closed, on the other hand, it provides a low impedance path (for example, less than 15 kilo-ohms) between a row and column. Generally, the total capacitance between any row and column follows the following equation:

$$C_{total} = \frac{\text{rows} \times \text{columns}}{\text{rows} + \text{columns} + 1} C$$

where C is the value of the capacitance formed by an open switch element 26 and is assumed to be equal for all switches in this example.

As depicted in FIG. 3, the capacitances associated with each switch 26 are identified by a row and column number. Hence a switch element 26 in the first row and first column (i.e., the upper left hand corner) is designated (0,0) and a switch in the upper right hand corner is designated (0,3). As shown in FIG. 3, switch (0,0) is closed and the remaining switch elements 26 are open. In this situation, when the first row of the switch matrix 10 is scanned by pulling the upper row conductor 22 low, capacitances connecting to the first row conductor 22, (0,1) to (0,3) and the first column conductor 24 (0,1) to (3,0) are joined in parallel to the first row by the closed switch element 26 and must be discharged prior to the row conductor being pulled low.

Conversely, when scanning of the first row is complete and it is desired to return the first row conductor 22 to its high voltage, each of these capacitances must be recharged through the pull-up resistors 34 and 38 as increased by the intrinsic resistance 30 of the row conductor 22. The combined distributed resistance of the switch matrix and the pull-up resistors and drivers, and these capacitances (and the EMI capacitors) retard the change in voltages on the row conductors 22. Delay in this recharging could cause an erroneous reading of a closed switch when the next row is scanned.

Figure 4:
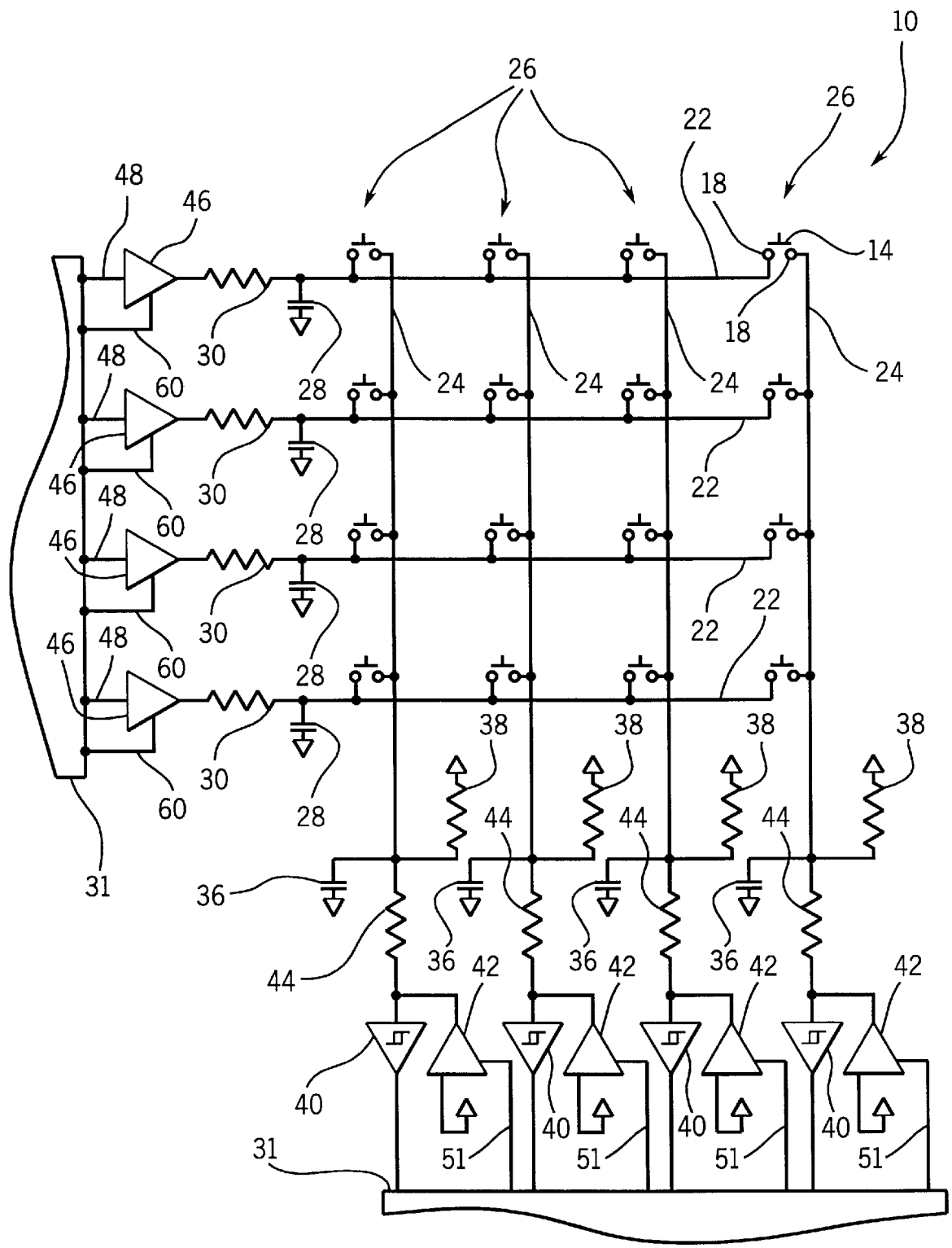
FIG. 4 is a schematic representation similar to that of FIG. 2 but showing the present invention using active driving of rows and columns with three-state row drivers.

Referring now to FIGS. 3 and 4 in the present invention, a switch matrix 10 is provided of similar construction to that of FIG. 2 with exceptions that will be described. As with the circuit of FIG. 2, a matrix of switch elements 26 is provided, arranged in rows and columns with column conductors 24 and row conductors 22. The open collector row drivers 32 are replaced with three-state row drivers 46 that actively sink and source current and which have a high impedance output state. Added are three-state column drivers 42 as will be described. The three-state column drivers 42 and the three-state row drivers 46 may be conventional discrete logic-type, three-state drivers or may be implemented in a single integrated circuit with other circuit elements of the scanning circuitry 31 and the detector amplifiers 40.

Figure 5:
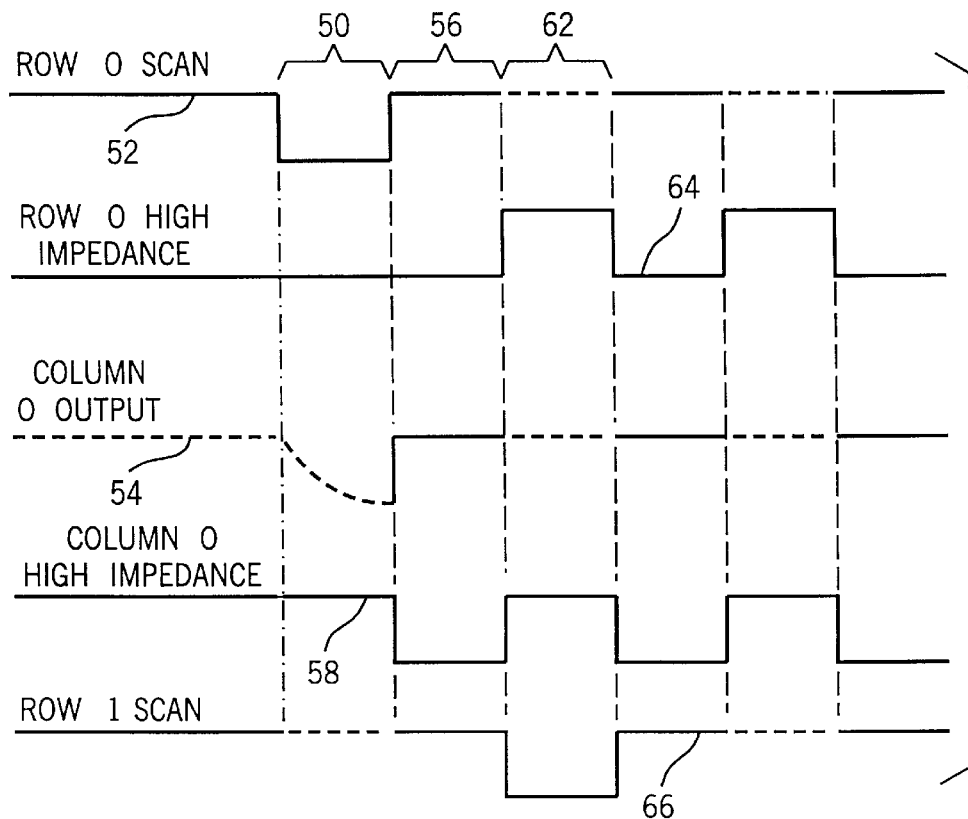
FIG. 5 is a timing diagram showing the coordination of the row drivers and column drivers during the present invention as implemented by the driving circuitry.

Referring now to FIGS. 4 and 5 in the present invention, the scanning circuitry 31 provides a scan signal over line 48 to one row at a time. For the first row, the scan signal will be provided during an interval 50 indicated in FIG. 5 and causes the output of the three-state row driver 46 to drop to a low voltage as provided by internal solid state switches connecting the output to ground and actively sinking current from the output. The voltage of the first row conductor 22 is indicated by trace 52 of FIG. 5.

During interval 50, the column conductor 24 is in a high impedance state (determined by the high value of pull-up resistor 38) and is generally free to float in voltage to follow any connected row conductors as indicated by the dotted line of trace 54. Column drivers 42 during interval 50 are held in a high impedance state by a high impedance signal over lines 51 to column drivers 42. This signal is indicated by trace 58 of FIG. 5.

Assuming as before that the switch element 26 of the first row and first column is closed at the beginning of interval 50, the first column conductor 24 experiences a drop in voltage in interval 50 as indicated by trace 54.

The decrease in voltage at the column conductor 24 will be detected by detector amplifier 40 and relayed to the scanning circuitry 31 which interprets this as a closure of the switch in the upper left hand corner according to decoding methods generally understood in the art.

Each of the other three-state row drivers 46 not receiving the scanning signal over their lines 48, instead receives a high impedance signal over lines 60. This high impedance signal causes these three-state row drivers 46, in this case for rows two through four, to exhibit a high impedance essentially disconnecting their outputs from their associated row conductors 22. Generally, the voltage on the first row conductor 52 would begin to rise at the beginning of interval 56 as a result of the row drivers 46 being high impedance and the pull-up resistors. In the present invention, however, at the end of interval 50 and as shown on trace 52 of FIG. 5, the scanning circuitry 31 no longer provides a scan signal over line 48 to three-state row driver 46, providing an effective 'pre-charge signal', and accordingly, the output of the three-state row driver returns to a high voltage state (a reset voltage) as indicated by trace 52 in interval 56. In addition, all other row drivers 46 are enabled without a scan signal (i.e., provided with the precharge signal) to drive high during this state.

Generally, the voltage on the first column conductor 24 indicated by trace 54 would begin to rise at the beginning of interval 56 as a result of the charging effect of the change in output of the three-state row driver 46. However in the present invention, the high impedance signals to column drivers 42 are deactivated by the scanning circuitry 31 and accordingly, the column conductors 24 are driven to the reset voltage by the column drivers as indicated by trace 54 during interval 56. Each column driver 42 is permanently connected to a high state so when the high impedance state is deactivated resulting in an effective 'back driving signal', the scanning state voltage appears on the output of column drivers 42. It will be apparent, therefore, that during reset interval 56, a charging of capacitances of the switch matrix 10 is provided both by all three-state row drivers 46 and all column drivers 42 at once.

The distributed resistance 30 of the row conductors 22 and the distributed resistance 44 of the column conductors 24 causes the charging rate of capacitances located near the particular row drivers 46 and column drivers 42 to be most rapidly charged by those close drivers. In addition, if the closed switch were to open during interval 50, the recharging by the three-state row drivers 46 would not be adequate to recharge the capacitances communicating only with the column conductor 24. Noise reduction capacitor 36 is uniquely positioned to be best charged by column drivers 42. Thus the use of both row drivers 46 and column drivers 42 to charge the capacitances of the switch matrix 10 improves the speed with which those capacitances may be recharged.

At the conclusion of the reset interval 56, the second row may be scanned during scanning period 62. At this time, the three-state row driver 46 of the first row moves to a high impedance state indicated by dotted lines in trace 52 as provided by a high impedance signal 64 provided on line 60 to that three-state row driver 46. The column outputs for all columns indicated by trace 54 again move to a high impedance state to detect closure of a switch 26 and the three-state row driver 46 for the second row moves to the low scan voltage as indicated by trace 66 in response to a signal from the scanning circuitry 31.

This scanning process is repeated until each of the rows is scanned and then the first row is scanned again.

The above description has been that of a preferred embodiment of the present invention. It will occur to those that practice the art that many modifications may be made without departing from the spirit and scope of the invention. In order to appraise the public of the various embodiments that may fall within the scope of the invention, the following claims are made.

We claim:

1. An addressable switch matrix comprising:

a plurality of switches having first and second terminals across which current may be switched, the first terminals electrically connected in rows and the second terminals electrically connected in columns;

three-state row driving circuits attached to each row for driving the row to one of a scan voltage, a pre-charge voltage different from the scan voltage, or providing a high impedance to the row according to received scan signals;

column input circuits attached to each column which produce a detection signal upon detecting a voltage from the column; and scanning circuitry providing scan signals to the three-state row driver circuits to selectively drive one row to the scan voltage during a scan period, then to the pre-charge voltage during a succeeding reset time, then to high impedance, the scanning circuitry further receiving the detection signals during the scan period to provide an indication of closed switches, the scanning circuitry further providing the high impedance at row driver circuits not receiving a scan signal during the scan time.

2. The addressable switch of claim 1 including also column output circuits attached to each column for driving the column to the pre-charge voltage upon receipt of a back-driving signal; and wherein the scanning circuitry provides the back driving signal to the column output circuitry during the scan period.

3. The addressable switch of claim 1 wherein the row driving circuits include solid state switching devices sinking and sourcing current to their outputs.

4. The addressable switch of claim 1 wherein the switches are membrane switches.

5. The addressable switch of claim 1 wherein the switches are transparent.

* * * * *